United States Patent [19]
Friedman

[11] Patent Number: 6,159,397
[45] Date of Patent: Dec. 12, 2000

[54] TRANSLUCENT EYEWEAR LENSES AND METHOD OF MANUFACTURE THEREFOR

[75] Inventor: Dean Friedman, Atlantic Beach, N.Y.

[73] Assignee: Eyecity.com, Inc., Plainview, N.Y.

[21] Appl. No.: 09/195,719

[22] Filed: Nov. 18, 1998

[51] Int. Cl.$^7$ ................................................ B29D 11/00
[52] U.S. Cl. .......................... 264/1.7; 264/2.6; 351/44; 427/162
[58] Field of Search ..................... 351/45, 46, 44; 264/1.1, 1.7, 2.5, 2.7, 1.36, 2.2, 2.6; 427/162

[56] References Cited

U.S. PATENT DOCUMENTS

| | | | |
|---|---|---|---|
| 4,364,878 | 12/1982 | Laliberte et al. | 264/2.2 |
| 4,542,964 | 9/1985 | Gilson et al. | 351/45 |
| 4,836,960 | 6/1989 | Spector et al. | 264/2.2 |
| 5,096,626 | 3/1992 | Takamizawa et al. | 264/1.7 |
| 5,523,030 | 6/1996 | Kingsbury | 264/1.7 |
| 5,710,613 | 1/1998 | Hughes | 351/45 |

*Primary Examiner*—Mathieu D. Vargot
*Attorney, Agent, or Firm*—J. de la Rosa

[57] ABSTRACT

The present invention is addressed to a method for fabricating lenses having at least one or more translucent regions used to reduce glare and/or increase visual acuity. To overcome the limitations of the prior art, an injection mold die having a selective portion thereof textured with a pattern or so-called "texture," which is replicated on the lens during injection molding, is employed to form a region of desired translucency on the finished lens. Various methods may be employed to fabricate the texture or pattern on the desired surface portion of the mold die, including mechanical engraving, chemical etching, and electrical-erosion machining (EDM and ECM). Typically, the texture or pattern includes multiple grained features of a quasi-repeating geometrical pattern distributed on the selected portion of the mold die. In general, the feature size of the texture or pattern is chosen such that the resulting replicated texture or pattern on the lens forms a region of desired translucency or a translucent region that normalizes glare to a level of diffuse illumination. That is, the translucent region is formed as having light diffusing characteristics, but allowing for the transmission of diffuse luminance.

75 Claims, 7 Drawing Sheets

TRANSLUCENT EYEWEAR LENSES AND METHOD OF MANUFACTURE THEREFOR

TECHNICAL FIELD

The present invention relates to eyewear, and more particularly, to eyewear, such as eyeglasses having lenses with translucent regions used to reduce glare and/or increase visual acuity.

BACKGROUND OF THE INVENTION

In recent years, various eyewear designs have been proposed to reduce glare and/or improve visual acuity, such as for use when viewing visual display terminals (VDTs) or participating in athletic activities. One particular eyewear design includes the use of upper and/or lower translucent bands or regions to reduce the amount of glare resulting from, for example, veiling illumination or ground glare. With respect to such an eyewear design, selected patents as discussed herein below are of interest, and are incorporated herein by reference.

U.S. Pat. No. 4,542,964 to Gilson et al. discloses an eyewear for reducing asthenopia developed by operators of visual display terminals (VDTs). The eyewear includes a frame removably positioned before the eyes which supports a transparent or clear optical region having an area extent for intercepting lines of sight only substantially below the mid-pupillary location of the eye. A translucent region extending upward from this latter mid-pupillary location advantageously blocks the eye's superior field of view so as to reduce the amount of veiling illumination, such as from overhead and/or window lighting. Importantly, the translucent region is formed as having light diffusing characteristics, but of sufficient diffuse luminance to avoid the wearer experiencing a so-called "blinder" effect. See also, U.S. Pat. No. 4,470,673, which discloses similar eyewear.

U.S. Pat. No. 5,432,568 to Betz discloses an eyewear which reduces glare-related vision problems for target shooters, hunters, archers, and the like. The eyewear includes a transparent region provided within the frontal portion of, for example, eyeglasses, for intercepting lines of sight substantially above and below the standard line of sight located at about the mid-pupillary position of the eyes. To both reduce overhead glare, and glare reflected from the ground to a constant level of diffuse illumination, upper and lower translucent regions are used. The upper and lower translucent regions are provided to extend from the standard line of sight, and the upper and lower peripheries of the frontal portion of the eyeglasses, respectively, to intercept portions of the superior and inferior field of views.

Various methods may be used to fabricate the translucent region(s), such as by roughing a surface portion of the transparent optical region through sanding, sandblasting or chemical etching. Alternatively, the translucent optical region can be formed by coating a portion of the transparent region with a material of sufficient translucency. Unfortunately, not only are these methods labor intensive, but also somewhat difficult to control, often resulting in poor quality and consistency.

Accordingly, it is desirable in the art to provide for a new process or method for manufacturing eyewear having at least one or more translucent regions, without the associated problems of the prior art.

SUMMARY OF THE INVENTION

The present invention is addressed to a method for fabricating lenses having at least one or more translucent regions used to reduce glare and/or increase visual acuity, and eyewear using such lenses. More specifically, the translucent region(s) is judiciously disposed on the lens to extend upward and/or downward from about the eye's standard line of sight for reducing glare, such as from veiling illumination, ground glare, and the like.

To overcome the limitations of the prior art, an injection mold die having a selective portion thereof textured with a pattern or so-called "texture," which is replicated on the lens during molding, is employed to form a region of desired translucency on the finished lens. Advantageously, using such an injection molding process not only provides a novel manufacturing process which is cost effective, but which also consistently provides lenses having translucent regions of superior quality.

Various methods may be employed to fabricate the texture or pattern on the desired surface portion of the mold die, including mechanical engraving, chemical etching, and electrical-erosion machining (EDM and ECM). Typically, the texture or pattern includes multiple grained features of a quasi-repeating geometrical pattern distributed on a selected portion of the mold die. In general, the feature size of the texture or pattern is chosen such that the resulting replicated texture or pattern on the lens forms a region of desired translucency or a translucent region that normalizes glare to a level of diffuse illumination. That is, the translucent region is formed as having light diffusing characteristics, but allowing for the transmission of diffuse luminance. This diffuse luminance is, however, preferably sufficient to avoid the wear experiencing a claustrophobic or "blinder" effect which would otherwise be observed if the corresponding region was opaque.

The translucent region can either be fabricated on the front and/or the back surface(s) of the lenses, as well as on upper and/or lower portion(s) of the lens for use in various activities, including for use in viewing visual display terminals (VDT), participating in athletic activities, or even useful in training pilots to fly under instrument flight rules (IFR) conditions. Moreover, the finished lens may be coated with a scratch resistant, ultraviolet (UV), or anti-reflective (AR) coating. Such thin film coatings may be readily applied using conventional coating techniques employed in the industry, such as thermal deposition or evaporation. Additionally, the lenses may be tinted using conventional dying, and then may be readily cut or edged to any peripheral shape so as to fit eyeglass frames of various shapes and sizes.

Lenses fabricated in accordance with the present invention can also be easily adapted for various uses, such as for use as prescription glasses, contact lenses, clip-on glasses, goggles and the like.

BRIEF DESCRIPTION OF THE DRAWINGS

The features and advantages of the present invention will become more readily apparent from the following detailed description of the invention in which like elements are labeled similarly and in which.

DETAILED DESCRIPTION

The present invention discloses a method for fabricating lenses having at least one or more translucent regions, used for example, in eyeglasses and contact lenses, so as to reduce glare and/or increase visual acuity. More specifically, the translucent region(s) is judiciously disposed on the lens to extend upward and/or downward from about the eye's standard line of sight for reducing glare, such as from veiling illumination, ground glare, and the like.

Importantly, to overcome the limitations of the prior art, the present invention utilizes an injection mold die having a selective portion thereof textured with a pattern or so-called "texture" which is replicated on the lenses, thereby forming a region or band of desired translucency on the finished lens, herein after referred to as the "translucent region." Of course, various thermoplastic materials may be used in the injection molding to fabricate the lenses, including, for example, polycarbonates, methacrylates, such as polymethyl, methacrylate, styrene, thermoplastic acrylic, polysuflone, and the like. Advantageously, using such an injection molding process not only provides a novel manufacturing process which is cost effective, but which also consistently provides lenses having translucent regions of superior quality.

Figure 1:
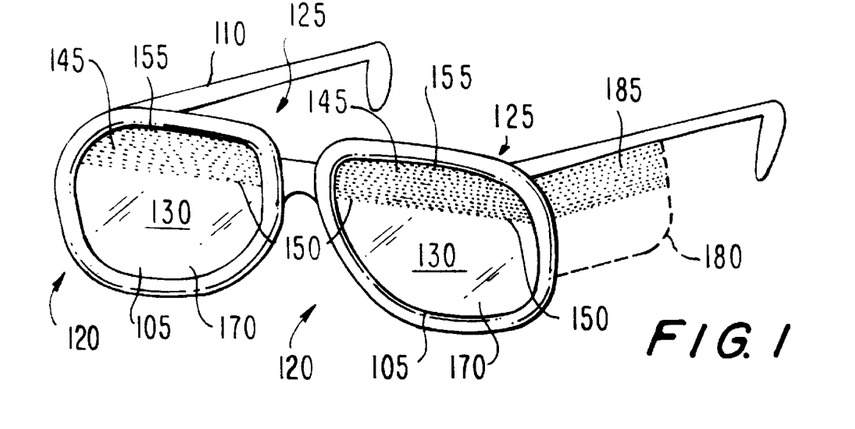
FIG. 1 is a perspective view of an embodiment of an eyewear design incorporating lenses fabricated in accordance with the principles of the present invention.
Figure 2:
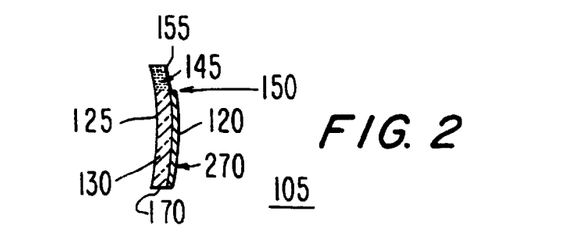
FIG. 2 is a cross section view of the translucent lenses shown in FIG. 1.
Figure 3:
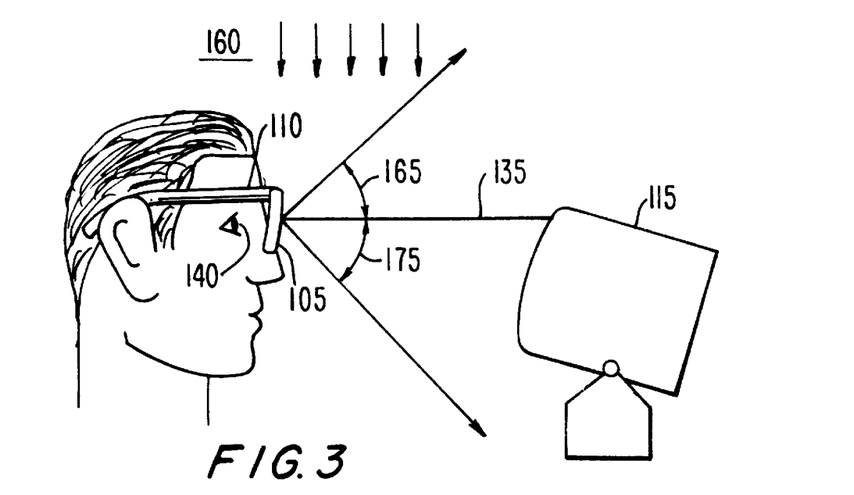
FIG. 3 is a side view of the head of an operator wearing the eyewear design of FIG. 1.

As shown in FIGS. 1–3, the principles of the invention will be described with reference to the fabrication of an exemplary pair of lenses 105 used in combination with a pair of eyeglass frame 110 for viewing a visual display terminal (VDT) 115. Lenses 105 each has a front surface 120 and a back surface 125, with the shapes thereof corresponding to the desired optical vision prescription of lenses 105. Of course lenses 105 may be plano. As discussed herein above, lenses 105 have a clear or transparent optical region 130, injection molded from a thermoplastic material, through which a user views VDT 115. The user normally views VDT 115 along a standard line of sight 135, extending from about the mid-pupillary position (MPP) 140 of the eye upwardly about 50° and downwardly about 70°.

Importantly, lenses 105 each also include translucent region 145 fabricated on corresponding surface portion of front surface 120, extending from a lower border or margin 150 to the top periphery 155 of lens 105. In this manner, translucent region 145 intercepts a portion, if not all, of the superior field of view so as to reduce glare emanating from, for example, overhead lighting sources, as depicted by arrows 160.

The superior field of view as indicated by arc 165, typically extends about 50° upward from standard line of sight 135. Clear optical region 130, however, extends from lower border 150 downward to the bottom periphery 170 of lens 105 so as to intercept most, if not all, of the inferior field of view, herein represented by arc 175. The inferior field of view typically extends about 70° downward from standard line of sight 135.

For visual clarity, there is a substantially linear, horizontal interface at each lower border 150 between translucent region 145 and transparent optical region 130. In this particular embodiment, lower border 150 is located at or just above standard line of sight 135. Depending upon the application for which lenses 105 are intended, or upon the preference of the wearer, translucent regions 145 may be extended or decreased in area extent to correspondingly provide an increased glare reduction or an extended field of view. Accordingly, it should be clearly understood that the above particular eyewear design is for purposes of illustration only, and not for purposes of limitation. Other suitable eyewear designs employing translucent regions of different extent and size can also utilize the principles of the present invention, as discussed herein below.

It is contemplated that eyeglass frame 110 may also be provided with side shield portions 180 extending downwardly from the front frame portion thereof. Of course, side shield portions 180 may also incorporate a side translucent region 185 extending upwardly from standard line of sight 135 for the purpose of improving the interception and diminution of glare generated by overhead illumination entering from the side of eyeglass frame 110. Alternatively, side shield portions 180 may be entirely translucent. In this manner, not only is the superior field of view rendered translucent, but the peripheral view considerably restricted to minimize visual distractions.

Now referring to FIGS. 4–8, there is shown the inventive process depicted schematically which is used to fabricate lenses having selectively disposed translucent regions 145, as depicted in FIGS. 1–3. A sleeve 190 is provided with a cylindrical bore 195 extending therethrough. Also, an injection port 200 extends through the sleeve wall to bore 195 thereof, with the exterior end of port 200 being dimensioned and adapted to releasably engage an injector nipple 205, such as the typical screw type injector known in the art. Bore 195 is also typically provided with an annular groove 210 spaced axially from injection port 200.

Figure 4:
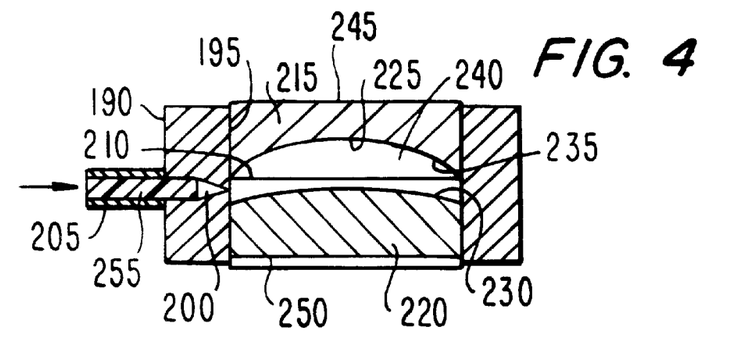
FIGS. 4–8 depict an exemplary schematic representation of the injection molding process used in making the lenses depicted in FIGS. 1–3 in accordance with the principles of the invention.

A pair of molding dies 215 and 220 are provided, the dies having cylindrical outer surfaces dimensioned to slidably fit within bore 195 with minimal clearance. Mold dies 215 and 220 are provided with convex and concave precision optical surfaces 225, and 230, respectively, corresponding to the desired surface contours of front and back surfaces 120, 125 of lens 105 for providing the optical vision prescription of the lens, if any. A portion of surface 225 is textured with a suitable pattern or "texture" 235 which is later replicated on finished lens 105, thereby forming translucent optical region 145. Surfaces 225 and 230, defining mold cavity 240, are typically fabricated from a suitably hard metal or glass, which is highly polished so that clear or transparent region 130 has an optically clear distortion free surface. Note that changing the curvature of the surfaces varies the lens shape or power. Also, mold dies 215, 220 have back surfaces 245 and 250, respectively, which are substantially flat or planar, facing away from mold cavity 240.

Typically, mold dies 215 and 220 are heated slightly above the glass transition temperature of the selected thermoplastic material, with sleeve 190 also heated to a temperature slightly higher than mold dies 215, 220. Initially, the heated dies are assembled in the bore of sleeve 190, and injector nipple 205 then engaged with injector port 200. Thermoplastic material or resin 255, which is heated to a viscous, flowable state, is then injected under high pressure into mold cavity 240 to fill the entire cavity in a manner well known in the art, and not discussed herein for the sake of clarity.

Figure 5:
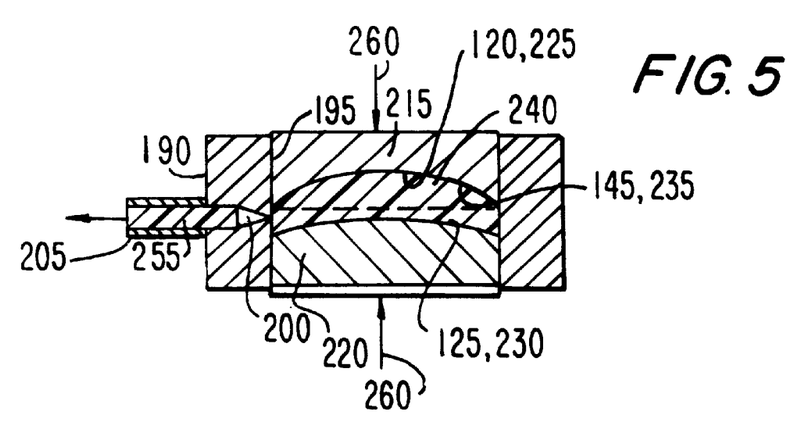
Figure 6:
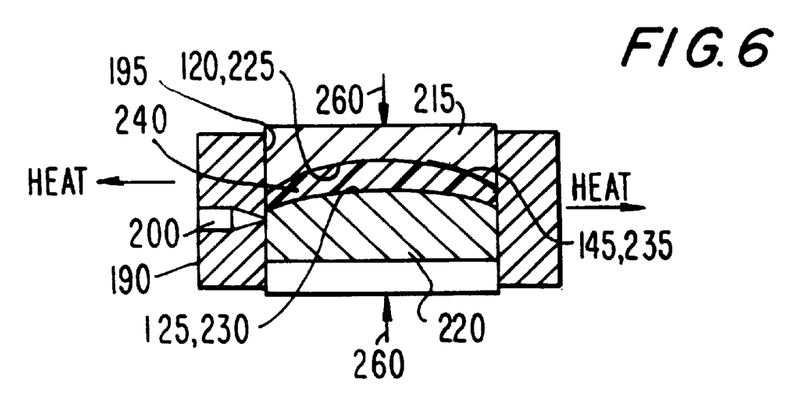

As shown in FIG. 5, following the thermoplastic injection, dies 215, 220 are compressed together, as indicated by arrows 260, to reduce the thickness of mold cavity 240 to the desired dimension of lens 105, and also to squeeze any excess thermoplastic material 255 in mold cavity 240 out through injector port 200. Thereafter, mold dies 215,220 are displaced axially in bore 195 relative to sleeve 190, thereby uncoupling mold cavity 240 from injector port 200, as shown in FIG. 6. With compressive pressure 260 applied to the dies, the assembled mold dies 215, 220 and sleeve 190 are allowed to cool, either passively or by active cooling means. As the assembly cools, thermoplastic material 255 losses heat, and cools below the glass transition temperature, forming solid lens 105.

Now, the material undergoes shrinkage due to thermal contraction and tends to pull away from the dies. Due to the presence of the relatively high compressive force 260 applied to the material by mold dies 215, 220, plastic material 255 cannot pull away form cavity surfaces 225, 230. In this manner, resulting lens 105 formed from plastic material 255 bears surface contours that are precise complementary replications of mold surfaces 225 and 230. Also, a replica of texture or pattern 235 is created on a corresponding portion of front surface 120, which constitutes translucent region 145.

Figure 7:
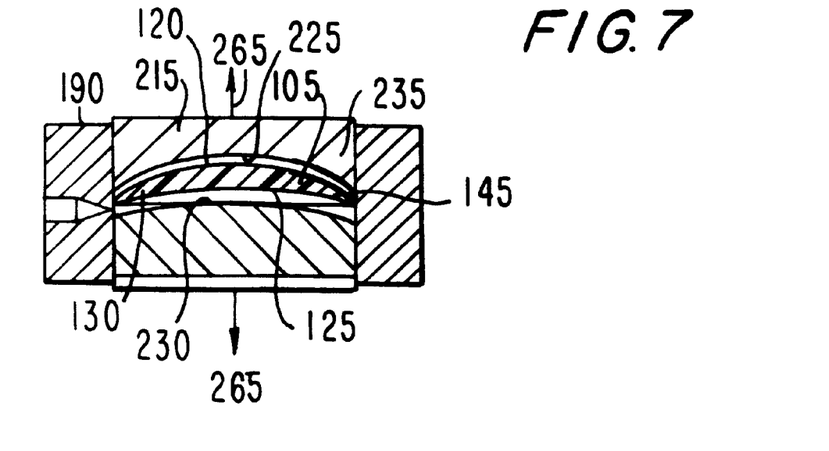
Figure 8:
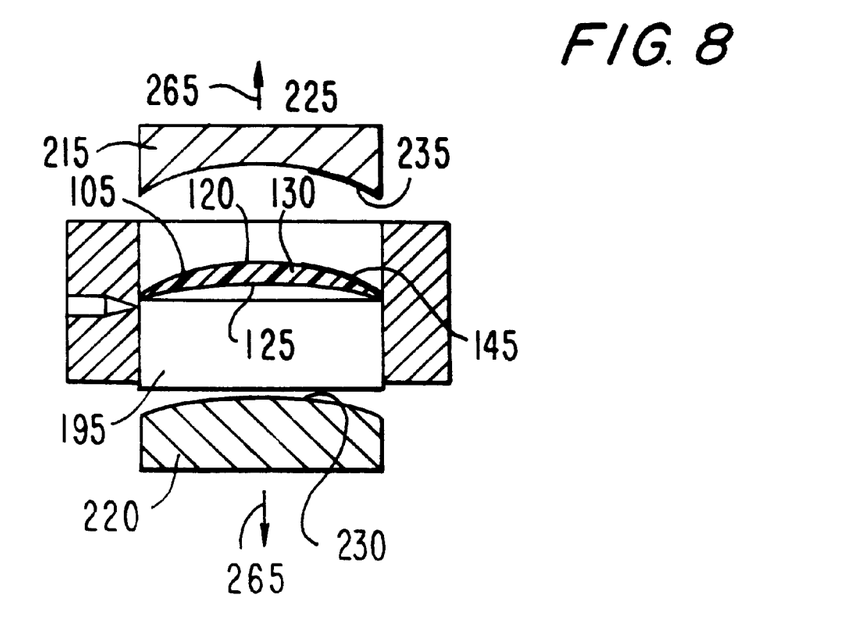

Once the mold assembly has cooled thermoplastic 255 below the transition temperature, and the plastic solidifies into lens 105, compressive force 260 is removed from mold dies 215, 220. A tensile force depicted by arrows 265 is then applied to separate dies 215, 220 axially, and pulls the dies from bore 195, as shown in FIGS. 7–8. As sleeve 190 and lens 105 cool further, the thermal expansion and contraction of the lens causes the release of the lens from annular groove 210.

After finished lens 105 is removed from cavity 240, lens 105 may then be coated with a scratch resistant coating, an ultraviolet (UV) coating, or an anti-reflective (AR) coating, such as magnesium oxide or fluoride. Referring back to FIG. 2, there is shown a cross section of lens 105, having a coating 270 applied to lens 105. Preferably, coating 270 is only applied up to lower border 150, either a single or multi-layer coating. That is, coating 270 is preferably only applied to transparent optical regions 130, and not to translucent regions 145. Such thin film coatings may be readily applied using conventional coating techniques employed in the industry, including thermal deposition or thermal evaporation, which are well known in the art. Also, as discussed herein below, lenses 105 may be tinted using conventional dying. Lenses 105 may be then readily cut or edged to any peripheral shape such that the lenses engage, for example, eyeglass frame 110, or other frames of various shapes and sizes.

Lenses fabricated in accordance with the present invention can easily be adapted for other particular uses. For example, the lenses may be made in a "clip-on" form to removably attach to prescription glasses. Alternatively, lenses 105 can be made fabricated in the form of lens blanks and made into prescription form by subsequently grinding the lens blank. If desired, the lenses may be made in the form of wrap around goggles.

Various methods may also be used to adjust the lens thickness, including varying the amount of injected mass of molten plastic 255 while varying the applied compressive force on mold dies 215, 220, as disclosed, for example, in U.S. Pat. No. 4,364,878, which is incorporated herein by reference. Alternatively, a slidably mated pair of opposing wedge blocks can be used to adjust the volume of the mold cavity 240, and thereby the lens thickness. See, for example, U.S. Pat. No. 5,512,221. Shims and/or inserts may also be used in a likewise manner to adjust the cavity volume, which is known in the art.

The method above described for injection molding plastic lenses, having one or more translucent regions, can also be readily applied to contact lenses made of for example, copolymers, such as polymethyl methacrylate (PMMA), silanes, hydroxy acrylate and the like. Likewise, the mold dies used for injection molding the contact lens can include a texture or pattern to fabricate contact lenses with regions or bands of desired translucency, depending on the desired application intended.

Figure 9:
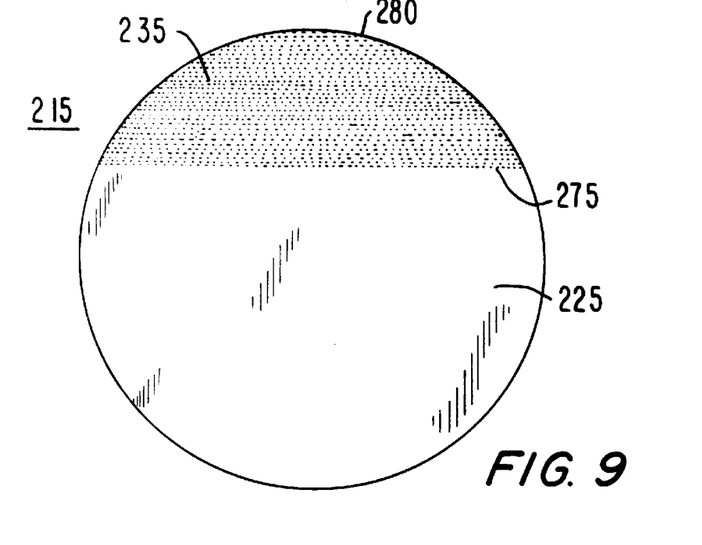
FIG. 9 is a front view of the mold die shown in FIG. 1 used to fabricate the front surface of the lens.
Figure 10A:
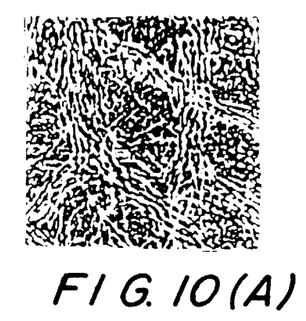
FIGS. 10(A) through 10(I) depict exemplary textures or patterns which may be used in accordance with the principles of the invention to fabricate the translucent regions or bands on the lenses.
Figure 10B:
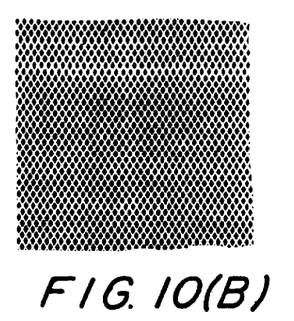
Figure 10C:
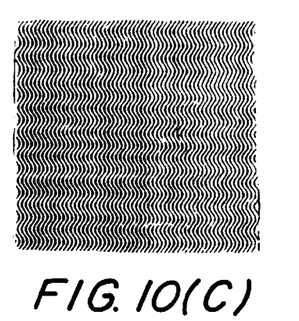
Figure 10D:
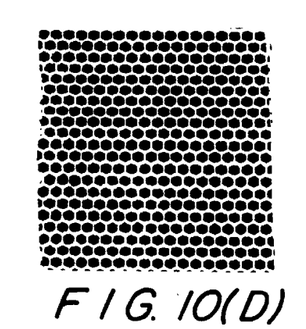
Figure 10E:
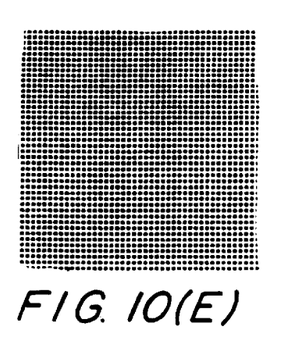
Figure 10F:
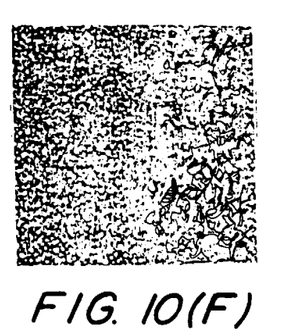
Figure 10G:
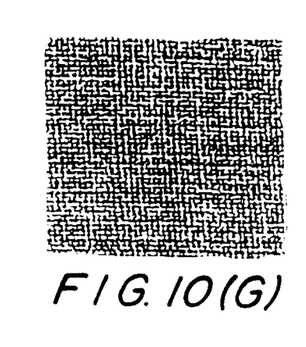
Figure 10H:
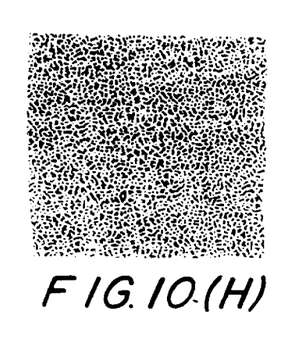
Figure 10I:
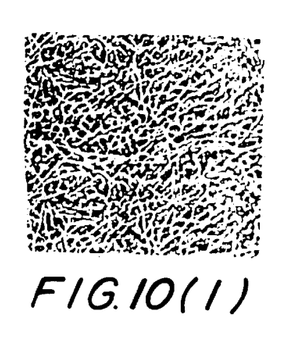

Shown in FIG. 9 is a front view of mold die 215 used in the above injection molding process for fabricating anterior or front surface 120 of lens 105. By way of iteration, on a selective surface portion of mold die 215, there is formed texture or pattern 235 used to create translucent region 145 on lens 105. For fabricating lens blanks of about 70 mm in diameter, texture 235 extends in area such that its lower margin or border 275 is about 10–15 mm from its upper periphery or edge 280. For 80 mm diameter lens blanks, however, texture 235 extends about 25–30 mm. Recall that resulting lens 105 formed from the plastic material bears a surface contour that is a precise complementary replica of surface 225 of mold die 215, including a replica of texture or pattern 235. For the above embodiment, lenses 105 are fitted into eyeglass frame 110 such that translucent regions 145 extend downward preferably about 10–mm from top periphery 155 of lenses 105. In this manner, translucent regions 145 are a distance from mid-pupillary eye position 140 so as to intercept most, if not all, of the superior field of view, thereby reducing glare.

Of course, translucent regions 145 can be fabricated on posterior or back surface 125 of lens 105 by disposing texture or pattern 235 on surface 230 of mold die 220. Still further, it is contemplated that texture or pattern 235 can be placed on both surfaces 225 and 230 so as to fabricate the translucent regions on both front and back surfaces 120 and 125, respectively, of lenses 105. As discussed herein below, both upper and lower translucent regions may also be fabricated on the lens for use in target shooting and, in general, athletic activities.

Various methods may be employed to fabricate texture or pattern 235 on the surface of mold die 225, including mechanical engraving, chemical etching, and electrical-erosion machining (EDM and ECM), which are all well known in the art. Note, that texture or pattern 235 includes multiple grained features, typically of a quasi-repeating geometrical pattern, distributed on a selected portion of the mold die. Various repeating geometrical textures or patterns may be fabricated on the mold die, including those textures or patterns shown in FIG. 10, which textures are commercially available from Mold-Tech, Inc., Chicopee, Mass., among others.

In general, however, the feature size of texture or pattern 235 is chosen such that the resulting replicated texture or pattern on lenses 105 forms a region of desired translucency or translucent regions 145, each that normalizes glare to a level of diffuse illumination. That is, translucent regions 145 are formed as having light diffusing characteristics, but allowing for the transmission of diffuse luminance. This diffuse luminance, however, should be preferably sufficient to avoid the wear experiencing a claustrophobic or "blinder" effect which would otherwise be observed if the corresponding region was opaque.

It is contemplated, however, that the diffusing characteristics of translucent regions 145 may be varied from top periphery 155 to lower margin or border 150 by correspondingly varying the size, shape and type of the texture disposed on the surface of the mold die. For achieving the preferred level of diffuse illumination in forming translucent region 145, however, the grain size features of the texture surface can of course be determined empirically.

Figure 11:
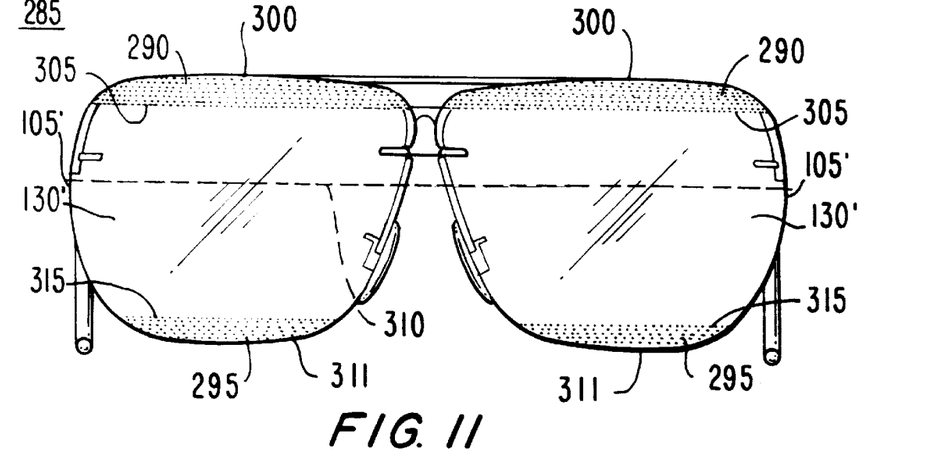
FIG. 11 is a front view of another embodiment of an eyewear design incorporating lenses fabricated in accordance with the principles of the present invention having upper and lower translucent regions.

Although in the above embodiment only a single translucent region has been fabricated on lens 105, for reducing glare related vision problems in certain sporting activities, it is advantageous to not only reduce overhead glare, but also glare reflected from the ground. Shown in FIG. 11 is an eyewear design 285 having both upper and lower translucent regions disposed on lenses 105' adapted for use in target shooting and, in general, sporting activities. This particular eyewear design is more fully disclosed in U.S. Pat. No. 5,432,568, which is incorporated herein by reference.

In accordance with the principles of the invention, lenses 105' are provided with transparent optical regions 130', and upper and lower translucent regions 290, and 295, respectively. Upper translucent regions 290 extend from the upper peripheries or edges 300 of lenses 105' downward toward its lower borders or interfaces 305, which is preferably about 1–8 mm from the mid-pupillary eye position, represented herein by dash line 310. Similarly, lower translucent regions 295 extend from lower peripheries or edges 311 upward toward its upper borders or interfaces 315, which likewise is preferably about 1–8 mm from mid-pupillary eye position 310. Again, there is preferably a substantially linear, horizontal interface between each translucent region and transparent optical region.

Figure 12:
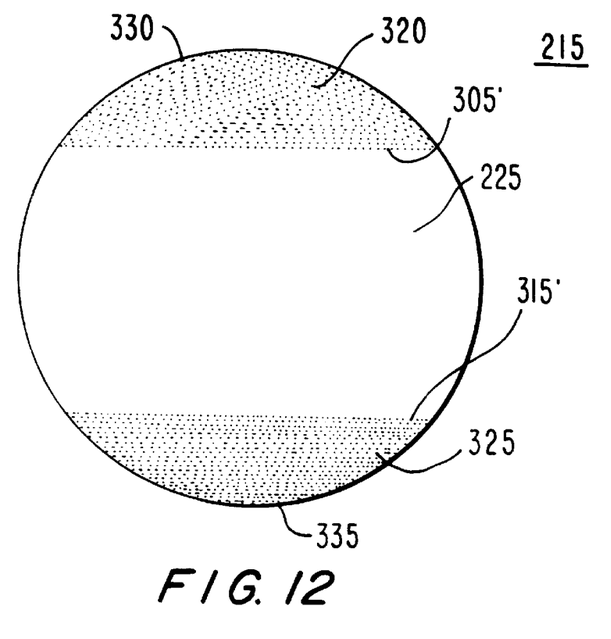
FIG. 12 is a front view of the mold die used to fabricate the front surface of the lenses shown in the eyewear design of FIG. 11.

As illustrated in FIG. 12, upper and lower translucent regions 290 and 295, respectively, are fabricated using mold die 215 having corresponding upper and lower portions 320, 325 thereof textured with texture or pattern 235. It should be understood, however, that upper and lower portions 320 and 325 may each have a different texture. Similarly, upper and lower portions 320 and 325 extend from upper and lower peripheries 330 and 335, respectively, to a distance above and below the mid-pupillary eye position, shown herein as solid lines 305' and 315', respectively. In this manner, upper and lower translucent regions 290 and 295 normalize overhead and ground reflected glare, respectively, to a level of diffuse illumination.

Figure 13:
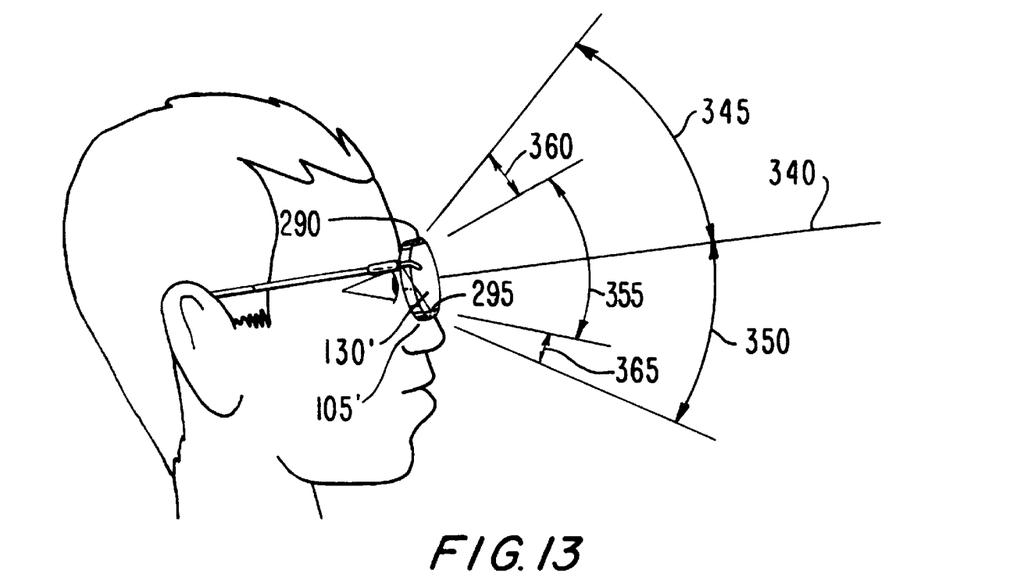
FIG. 13 is a side view of the head of a person wearing the eyewear design of FIG. 11.

As shown in FIG. 13, in this latter embodiment, the wearer typically has a standard line of sight 340 which divides the normal visual limits of the wearer into an upper or superior field of view, which extends upward about 50° as is represented by arc 345, and a lower or inferior field of view, which extends downward about 70° as is represented by arc 350. Within the visual limits defined by arcs 345, 350, transparent optical regions 130' each is fabricated as having an area extent for intercepting lines of sight substantially above and below standard line of sight 340 so as to provide field of view limits defined by arc 355. Importantly, mold die 215 is textured on corresponding portions 320, 325 thereof to provide upper and upper translucent regions 290, 295 that intercept portions of the superior and inferior field of views, as defined by arcs 360 and 365, respectively. In this manner, glare from overhead sources, such as the sun, or that reflected from the ground or water, is substantially diminished by virtue of being intercepted by translucent regions or bands 290, 295.

For maximum overhead glare reduction, it is preferred that upper translucent region 290 completely extends from lower border 305 to upper periphery 300. Likewise, for maximum glare reduction, lower translucent region 295 preferably should completely extend from upper border 315 to lower periphery 311. It should be clearly understood, however, that the area extent of upper and lower translucent regions 290 and 295 is dependent upon the application for which the eyewear is intended, or upon the preference of the wearer. For example, translucent regions 290 and 295 may be configured to form a substantially enclosed region, such as an annular region, such that transparent region 130' is surrounded by the translucent regions. If desired, side shield portions may also be used to minimize glare entering along the peripheral view of the wearer.

Although visual acuity is generally improved using the above various eyewear designs, visual performance may be further improved by tinting the transparent or clear optical regions 130, 130'. That is, the transparent or clear optical regions may be fabricated of a pigmented clear material. For example, transparent or clear regions 130, 130' may be tinted with a color from the mid-spectral range of the visible spectrum, such as yellow, where the spectral sensitivity of the eye is about at its peak. Also, inasmuch as the human eye exhibits a considerable amount of chromatic aberration, the eye only focuses one wavelength precisely on the retina. All other wavelengths are focused at some focal point in front or behind the retina. Tinting the transparent optical region yellow serves to reduce the chromatic aberration by eliminating certain wavelengths, such as blue, which are most out of focus, without a perceived darkening effect. Of course, for certain athletic activities, other color tints beside yellow may be employed to improve eye comfort and visual acuity.

Conventional methods may be used to tint the lenses, such as by mixing the thermoplastic material with an inert color pigment that diffuses uniformly through the plastic. Alternatively, the finished lenses may be dipped into a suitable bath of dye of the desired color.

Of course, the eyewear may be fabricated for general use as sunglasses so as to reduce reflected glare. In this latter case, non-spectral pigmentation may be used, such as a gray or brown tint. Where the lens are fabricated of a polycarbonate material, a desirable blocking of ultraviolet (UV) radiation additionally may be effected to provide the wearer with enhanced eye protection. Otherwise, a suitable UV coating can be applied on the lenses, for example, by dipping the lenses in a suitable bath, preferably only up to the translucent regions, before cutting and glazing the lenses, as discussed herein above.

It is well known that when a subject changes visual fixation from a distance object or target to nearer objects, there occurs a neurological triad response. For example, when viewing a VDT or computer screen at a close distance, the ciliary body within the eye changes the shape of the cornea to obtain a clear retinal image of the screen. After an extended viewing period, however, the eye becomes underaccommodated, which results in a blurring of near objects.

When, the viewer then looks at a distant object, accommodation is not completely relaxed, and the viewer remains over-accommodated, with distance objects then also becoming blurred.

Accordingly, it is contemplated that in certain embodiments, the transparent or clear optical region may be provided with a relatively low plus optical power, selected below about one diopter, about from 0.25 to 0.75 diopters. This correction enables the user to focus on near object, without needing accommodation otherwise required if the clear region were plano in nature, thereby reducing or eliminating blurring that would occur at both distance and near viewing as a result of long periods of viewing. In effect, the added optical power reduces the amount of ciliary contraction required for the user to focus on, for example, the computer screen. Of course, the lenses may be fabricated in the form of prescription lenses with an optical power from about 0.25–4.00 diopters.

Figure 14:
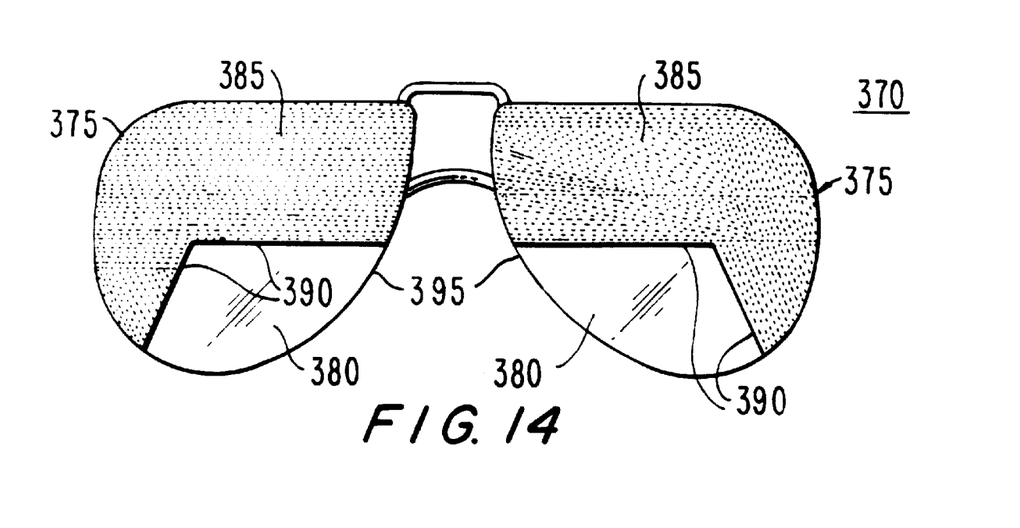
FIG. 14 is a front view of another embodiment of an eyewear design incorporating lenses fabricated in accordance with the principles of the invention useful in training pilots to fly under IFR conditions.

Referring now to FIG. 14, there is shown another embodiment of an eyewear 370, which is similar to the above latter embodiment, except that the present injection molding process has now been modified so as to fabricate a pair of eyeglasses useful for training pilots under instrument flight rules (IFR) conditions. More specifically, eyewear 370 includes lenses 375 which are operatively connected to a supporting eyeglass frame. Similarly, each lens includes a transparent or clear region 380, and translucent regions 385 which covers a majority of the surface of lenses 375. Translucent regions 385 may have various shapes, but it is generally preferable that each occupies the upper portion of the lens and extend downward and outward along lower borders 390, including the lateral sides of the lens. This is accomplished by texturizing corresponding portions of the mold dies used in injection molding lenses 375, as discussed herein above, so as to create the desired regions of translucency.

With translucent regions 385 extending in this manner, transparent region 380 is positioned in the lower medial portion of the lens, and extends upward and inward to the lateral insides 395 thereof. Translucent regions 385 effectively intercept a forward line of sight directed toward the exterior of the aircraft, whereas transparent regions 380 permit vision along a forward line of sight interior to the aircraft's cockpit, and, more specifically, toward the instrument panel.

Furthermore, it is contemplated that lenses 385 may be fabricated in a mounting mechanism enabling the pilot to clip-on the lenses in manner similar to a conventional sunglass clip-on. Such a mounting mechanism may also include the use of a mechanism to selectively raise and lower the clip-on. Such a mechanism is available from Foster Grant Co., among others.

Figure 15:
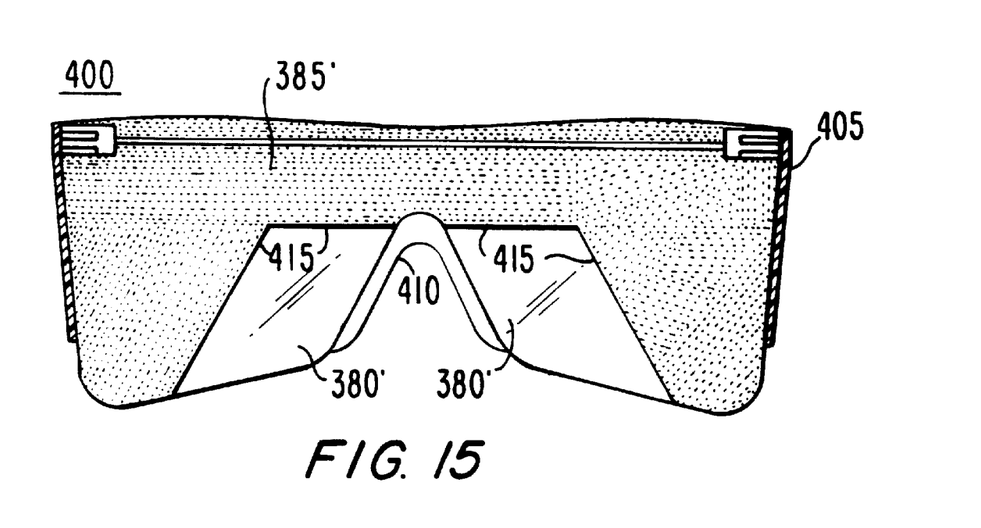
FIG. 15 is the eyewear design of FIG. 14 embodied in the form of goggles.

Alternatively, the above eyewear may be fabricated in the form of conventional goggles, which may be worn separately or over existing glasses or contact lenses. Referring to FIG. 15, there is shown pilot goggles 400 having a lens region 405 made of, for example, a polymeric material such as polystyrene or polycarbonate. Similarly, lens region 405 includes a transparent or clear regions 380' which have been injection molded integrally with a downward forward support region 410 which serves, along with earpieces (not shown) to support goggles 400 before the eyes of the pilot. Transparent regions 380' extend in area as defined by solid lines 415 so as to intercept substantially all forward vision of the pilot. Translucent region 385', outwardly disposed on the surface of lens region 405, occludes the pilot's vision, but permits unrestricted vision through clear regions 380'. In this manner, the pilot is permitted to observe the instrumentation within the cockpit, while vision through the windshield of the aircraft is restricted in a manner which simulates adverse weather conditions. Likewise, translucent region 385' permits light, albeit diffused, to pass through to avoid any claustrophobic effects.

Thus, a method for injection molding lenses with at least one or more translucent regions has been disclosed. The lenses fabricated use a modified injection molding process, providing such lenses at a substantially lower cost and using less labor than is possible with prior art techniques.

It should be emphasized that the above described injection molding process is merely an example of the how the present invention may be implemented in order to fabricate translucent regions on lenses. Other injection molding methods may readily be realized by those skilled in the art and who have been equipped with the understanding of the operation of the present invention as set forth in the above description.

Accordingly, it should be clearly understood that the embodiments herein are merely illustrative of the principles of the invention. Various modifications may be made by those skilled in the art which will embody the principles of the invention and fall within the spirit and the scope thereof. Thus, inasmuch as the invention herein primarily concerns a method for fabricating the translucent regions, rather that the purpose and effect of providing the translucent regions, additional uses for the translucent regions which may be conceived are anticipated to fall within the scope of the present invention.

What is claimed is:

1. In a process for injection molding a lens wherein a thermoplastic material is injected into a mold cavity, a method for fabricating a translucent region on a surface portion of the lens, comprising the steps of:

providing first and second mold dies defining a mold cavity therebetween, said first and second mold dies each having front and back surfaces; and texturizing a first portion of said front surface of said first mold die with a first texture by engraving, etching or machining said front surface with a quasi-repeating geometrical pattern, which pattern is replicated on a corresponding portion of the front surface of the lens during injection molding, with the feature size of the texture chosen such as to form a first translucent region having light diffusing characteristics, but allowing the transmission of diffuse luminance, with the remaining portion of the lens forming a transparent region having an interface therebetween.

2. The method of claim 1 further comprising the step of positioning said interface about 1–8 mm from the mid-pupillary eye position of the wearer.

3. The method of claim 1 wherein said first translucent region extends from a predetermined distance from about the mid-pupillary eye position of the wearer to the top periphery of the lens.

4. The method of claim 1 wherein said first translucent region extends from about the mid-pupillary eye position of the wearer to the top periphery of the lens.

5. The method of claim 1 wherein said first translucent region extends a predetermined distance from about the mid-pupillary eye position of the wearer to the bottom periphery of the lens.

6. The method of claim 1 wherein said first translucent region extends downward from about the mid-pupillary eye position of the wearer to the bottom periphery of the lens.

7. The method of claim 1 wherein said first translucent region occupies the upper portion of the lens and extends downward and outward along the lower lateral periphery of the lens.

8. The method of claim 1 wherein said translucent region and said transparent region have a distinct horizontal interface.

9. The method of claim 8 wherein said geometrical pattern is selected from the textures shown in FIG. 10.

10. The method of claim 1 further comprising the step of texturizing a first portion of the front surface of said second mold die with a second texture which is replicated on a corresponding portion of the back surface of the lens during injection molding, thereby forming a second translucent region.

11. The method of claim 10 wherein said second texture is substantially the same as said first texture.

12. The method of claim 10 wherein said second texture is substantially different than said first texture.

13. The method of claim 10 wherein said first and second translucent regions are substantially overlapping when viewed along the optical axis of the lens.

14. The method of claim 10 wherein said first and second translucent regions are substantially non-overlapping when viewed along the optical axis of the lens.

15. The method of claim 10 wherein said first and second translucent regions have substantially the same size and shape.

16. The method of claim 1 wherein said first texture is substantially uniform such that the diffuse transmissivity of said first translucent region is correspondingly uniform.

17. The method of claim 1 wherein said first texture is substantially nonuniform such that the diffuse transmissivity of said first translucent region substantially varies along a predetermined direction.

18. The method of claim 17 wherein said predetermined direction is along a direction from the top periphery to the bottom periphery of the lens.

19. The method of claim 1 further comprising the step of texturizing a second portion of the front surface of said first mold die with said first texture which is replicated on another corresponding portion of the front surface of the lens during injection molding so as to form a second translucent region.

20. The method of claim 19 wherein said first and second translucent regions intercept portions of the inferior and superior field of views of the wearer, respectively.

21. The method of claim 19 wherein said second translucent region extends a predetermined distance from about the mid-pupillary eye position of the wearer to the bottom periphery of the lens.

22. The method of claim 19 wherein said second translucent region extends from the mid-pupillary eye position of the wearer to the bottom periphery of the lens.

23. The method of claim 1 wherein said thermoplastic material is polycarbonate.

24. The method of claim 1 wherein said first translucent region extends in area so as to intercept a portion of the superior field of view of the wearer.

25. The method of claim 1 wherein said first translucent region extends in area so as to intercept a portion of the inferior field of view of the wearer.

26. The method of claim 1 further comprising the step of providing said front surfaces of said first and second mold dies with convex and concave surfaces, respectively.

27. The method of claim 26 wherein said front and back surfaces of said lens have the surface contours of said convex and concave surfaces, respectively, so as to thereby provide said lens with an optical power.

28. The method of claim 27 wherein said optical power is about from 0.25 to 4.00 diopters.

29. The method of claim 1 further comprising the step of coating said lens with a thin film coating.

30. The method of claim 29 wherein said thin film is selectively coated only on said transparent optical region.

31. The method of claim 29 wherein said thin film coating is a scratch resistant coating.

32. The method of claim 29 wherein said thin film coating is an ultraviolet (UV) coating.

33. The method of claim 29 wherein said thin film coating is an anti-reflective (AR) coating.

34. The method of claim 1 further comprising the step of cutting or edging said lens to a particular shape so as to fit a desired eyeglass frame.

35. The method of claim 1 further comprising the step of tinting said lens with a desired color.

36. The method of claim 35 wherein said desired color is yellow.

37. The method of claim 35 wherein said desired color is brown.

38. The method of claim 35 wherein said desired color is gray.

39. A method for fabricating a lens having a transparent region and at least a first translucent region on surface portions of the lens, comprising the steps of:

providing first and second mold dies, each having front and back surfaces, said front surfaces of said first and second mold dies defining a mold cavity therebetween;

texturizing a first portion of the front surface of said first mold die with a first texture by engraving, etching or machining said front surface with a quasi-repeating geometrical pattern;

heating said mold cavity to a temperature at which the thermoplastic material is in a molten state;

injecting a thermoplastic material into said mold cavity and then applying pressure to force the mold dies together; and cooling the thermoplastic material in said mold cavity, thereby hardening the thermoplastic material so as to form a lens with first and second surfaces having the surface contours of said front surfaces of said first and second mold dies, respectively, wherein a portion on said first surface of the lens includes a replica of said first texture defining a first translucent region having a distinct interface with a transparent region, the feature size of the first texture chosen so as to imbue said first translucent region with light diffusing characteristics, but allowing diffuse luminance therethrough which extends in area to intercept a portion of the wearer's field of view.

40. The method of claim 39 further comprising the step of positioning said distinct interface about 1–8 mm from the mid-pupillary eye position of the wearer.

41. The method of claim 39 wherein said first translucent region extends from a predetermined distance from about the mid-pupillary eye position of the wearer to the top periphery of the lens.

42. The method of claim 39 wherein said first translucent region extends from about the mid-pupillary eye position of the wearer to the top periphery of the lens.

43. The method of claim 39 wherein said first translucent region extends a predetermined distance downward from about the mid-pupillary eye position of wearer to the bottom periphery of the lens.

44. The method of claim 39 wherein said first translucent region extends downward from about the mid-pupillary eye position of the wearer to the bottom periphery of the lens.

45. The method of claim 39 wherein said first translucent region occupies the upper portion of the lens and extends downward and outward along the lower lateral periphery of the lens.

46. The method of claim 39 wherein said geometrical pattern is selected from the textures shown in FIG. 10.

47. The method of claim 39 further comprising the step of texturizing a first portion of the front surface of said second mold die with a second texture which is replicated on a corresponding portion of the back surface of the lens, thereby forming a second translucent region.

48. The method of claim 47 wherein said second texture is substantially the same as said first texture.

49. The method of claim 47 wherein said second texture is substantially different than said first texture.

50. The method of claim 47 wherein said first and second translucent regions are substantially overlapping when viewed along the optical axis of the lens.

51. The method of claim 47 wherein said first and second translucent regions are substantially non-overlapping when viewed along the optical axis of the lens.

52. The method of claim 47 wherein said first and second translucent regions have substantially the same size and shape.

53. The method of claim 39 wherein said first texture is substantially uniform such that the diffuse transmissivity of said first translucent region is correspondingly uniform.

54. The method of claim 39 wherein said first texture is substantially nonuniform such that the diffuse transmissivity of said first translucent region substantially varies along a predetermined direction.

55. The method of claim 54 wherein said predetermined direction is along a direction from the top periphery to the bottom periphery of the lens.

56. The method of claim 39 further comprising the step of texturizing a second portion of the front surface of said first mold die with said first texture which is replicated on another corresponding portion of the front surface of the lens so as to form a second translucent region.

57. The method of claim 56 wherein said first and second translucent regions intercept portions of the inferior and superior field of views of the wearer, respectively.

58. The method of claim 56 wherein said second translucent region extends a predetermined distance downward from about the mid-pupillary eye position of the wearer to the bottom periphery of the lens.

59. The method of claim 56 wherein said second translucent region extends from about the mid-pupillary eye position of the wearer to the bottom periphery of the lens.

60. The method of claim 39 wherein said thermoplastic material is polycarbonate.

61. The method of claim 39 wherein said first translucent region extends in area so as to intercept a portion of the superior field of view of a wearer.

62. The method of claim 39 wherein said first translucent region extends in area so as to intercept a portion of the inferior field of view of a wearer.

63. The method of claim 39 wherein said front surfaces of said first and second mold dies are convex and concave surfaces, respectively.

64. The method of claim 63 wherein said front and back surfaces of said lens have the surface contours of said convex and concave surfaces, respectively, so as to thereby provide said lens with an optical power.

65. The method of claim 64 wherein said optical power is from about 0.25 to 4.00 diopters.

66. The method of claim 39 further comprising the step of coating said lens with a thin film coating.

67. The method of claim 66 wherein said thin film is selectively coated only on said transparent region.

68. The method of claim 66 wherein said thin film coating is a scratch resistant coating.

69. The method of claim 66 wherein said thin film coating is an ultraviolet (UV) coating.

70. The method of claim 66 wherein said thin film coating is an anti-reflective (AR) coating.

71. The method of claim 39 further comprising the step of cutting or edging said lens to a particular shape so as to fit a desired eyeglass frame.

72. The method of claim 39 further comprising the step of tinting said lens with a desired color.

73. The method of claim 72 wherein said desired color is yellow.

74. The method of claim 72 wherein said desired color is brown.

75. The method of claim 72 wherein said desired color is gray.

* * * * *